United States Patent Office 3,007,799
Patented Nov. 7, 1961

3,007,799
BROMINATED MUSTARD AND METHOD OF PREPARING THE SAME
Edgar A. Ferguson, Jr., 150 Woodruff Ave., Brooklyn 26, N.Y.
No Drawing. Filed Apr. 30, 1959, Ser. No. 809,924
3 Claims. (Cl. 99—140)

The present invention relates to a new and improved condiment.

Mustard preparations have of course been known for many centuries as condiments which add a savory flavor to food, thus aiding in psychological factors of digestion. One of the commonest preparations has been a mixture of mustard flour with a small amount of water. This paste has been spread on foods as a condiment. In larger quantities mustard has also been used as an internal carminative for human and veterinary use, and in certain concentrations acts as an emetic.

Mustard belongs in the botanical classification of *Brassica alba* and *B. nigra*. There is another species which is commonly found growing wild in the United States and there are various European varieties, but the usual commercial flour of mustard is made from either of the two main botanical varieties noted above. The chemistry of one of the main active constituents to which substantially all of the action of mustard is attributed is well known. Isothiocyanate is allyl mustard oil, commonly known as mustard oil. The odor and taste of mustard seeds *Brassica nigra* are due to this compound. It does not exist as such in the seeds, but is formed from a glucoside, potassium myronate, when the seeds are pulverized and left in contact with water. The reaction is a process of fermentation, and is due to the presence of an enzyme, myrosin, in the seeds:

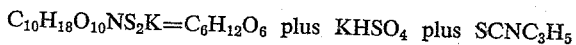

$C_{10}H_{18}O_{10}NS_2K = C_6H_{12}O_6$ plus $KHSO_4$ plus $SCNC_3H_5$

It is a liquid sparingly soluble in water and exceedingly pungent odor, which produces blisters on the skin. B.P. 151°. Other constituents of mustard may have some condiment or carminative effect in addition to the main ingredient.

It is the purpose of the present invention to provide a new and improved condiment derived from mustard. It has been noted that most condiments, carminatives, and spices generally cause an increase in the relative amount of acidity of the stomach and are therefore contra-indicated in cases of hyperacidity. It is a still further object to provide a process for the manufacture of a new mustard derivative useful as described.

In accordance with the present invention the new mustard derivatives are prepared by treating mustard seeds which have been milled into flour, either in a form containing natural moisture or in the form which has been wetted following desiccation, with elemental bromine. This bromination may be accomplished in an aqueous, mildly alkaline, organic solvent medium. It has been found moreover in accordance with the present invention that this bromination procedure causes saturation of some of the double bonds in the allyl isothiocyanate constituent of the mustard. Other brominating reactions unquestionably occur during the bromination procedure, some of these reactions resulting in the formation of bromides from the inorganic salt content of mustard. In addition some of the protein content of the mustard is likewise converted into brominated derivatives. However, as far as the discovery is concerned upon which the present invention is predicated, the substantial important reaction is that of elemental bromine upon the allyl isothiocyanate. It should be understood that the exposition of this theory does not in any way limit the scope or spirit of the invention as expressed in the specifications and claims but is merely given as an explanation to make more complete the understanding of the manufacture and use of the new product of this invention.

According to the preferred embodiment of the present invention the amount of bromine in the brominated mustard should be between 7 and 25% by weight, and is most preferably 12% by weight.

For a further understanding of the invention the following specific processes are given below. It is to be understood that these examples in no way limit the invention, but other means may be apparent to one skilled in the art which are within the scope of the specifications and appended claims.

Example 1

To one pound of mustard flour is added 2 quarts of cold water. The mixture is stirred until a thin slurry is made. The mixture is allowed to stand at room temperature for approximately 2 hours. At the end of 2 hours 100 cc. of 5% (5 grams of sodium hydroxide in 100 cc. of water) NaOH is added. 10 cc. of ethyl alcohol is also added to the mixture. 3½ oz. of bromine (NF) is added slowly with stirring over a period of 20 minutes. The mixture is allowed to stand for at least 2 hours. The mixture is then desiccated by means of infra-red lamps to give the final product which is ground to a fine powder.

It is to be understood that other alkalies in corresponding concentrations may be substituted for the sodium hydroxide of this process. Potassium hydroxide may be successfully used and the alkali carbonates of sodium and potassium have also been successfully used in corrected amounts. Furthermore other low molecular weight organic solvents may be substituted for the ethyl alcohol so long as they are non-toxic particularly with regard to the residue after bromination.

Example 2

The general process given above is particularly suitable for *Brassica alba*. When *Brassica nigra* is used the amount of mustard flour may be increased to one and one-half times. In addition the amount of elemental bromine must be increased to 4 ounces. No other change has been found necessary to produce a product similar in effect to that produced by *Brassica alba*.

Example 3

One pound of mustard flour ground from *Brassica alba* and adjusted to a moisture content of less than 2% is added to a vat containing 800 cc. of cold water. A stirrer is placed in the mixture and it is continuously stirred for a period of 4 hours at room temperature. At the end of this time 2cc. of an 8% solution of sodium hydroxide in water is added. After the mixture of sodium hydroxide has been added and the whole is stirred for a few minutes a sample is withdrawn and titrated to a pH of 8.5 to 9 by the addition of a larger quantity of an 0.8% solution of sodium hydroxide. If the original addition has caused this change in pH to occur already, more fresh mustard is added which has been allowed to stand at room temperature in cold water for at least one hour. Other adjustments can be made to compensate for this addition of mustard flour. At this point 8 cc. of ethyl alcohol is added to the mixture and stirred. The mixture is then continuously stirred for 10 minutes during the addition of one ounce of bromine, N.F. The mixture is allowed to stand for at least 3 hours at room temperature. The mixture is then desiccated to give the final product. The desiccated coarse granules are ground to a fine powder. This product may be ground with sodium chloride, approximately one-half, to make a condiment.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of manufacturing a new condiment which comprises adding elemental bromine slowly to chemically unaltered mustard flour at alkaline pH, and then drying and recovering the resulting product, said solid product containing the brominated and unbrominated portion of the mustard flour.

2. Mustard having bromine chemically bound thereto.

3. Mustard having 7–25% by weight of bromine chemically bound thereto.

References Cited in the file of this patent

The Chemical Senses: by Moncrieff, Leonard Hill Limited, 17 Stratford Pl., W1, London, 1944, page 225.

The Chemistry and Technology of Food and Food Products: by Jacobs, second edition, Interscience Publishers, Inc., New York, 1951, vol. II, pp. 1718 and 1719.